United States Patent [19]

Laing

[11] 3,978,660

[45] Sept. 7, 1976

[54] ROTARY HEAT EXCHANGERS IN THE FORM OF TURBINES

[76] Inventor: Nikolaus Laing, Hofener Weg 35-37, 7141 Aldingen near Stuttgart, Germany

[22] Filed: Apr. 1, 1974

[21] Appl. No.: 457,131

Related U.S. Application Data

[62] Division of Ser. No. 84,097, Oct. 26, 1970, Pat. No. 3,811,495.

[52] U.S. Cl. .............................. 60/39.51 R; 165/86; 165/107
[51] Int. Cl.² ........................................... F02C 7/08
[58] Field of Search ...................... 165/85, 86, 107; 60/39.51 R

[56] References Cited
UNITED STATES PATENTS

| | | | |
|---|---|---|---|
| 3,266,564 | 8/1966 | Sabatiuk | 165/86 |
| 3,355,883 | 12/1967 | Beam, Jr. | 60/39.51 R |
| 3,465,518 | 9/1969 | Erwin | 60/39.51 R X |

*Primary Examiner*—Albert W. Davis, Jr.
*Attorney, Agent, or Firm*—Karl F. Ross; Herbert Dubno

[57] ABSTRACT

One of two axially spaced annular heat exchangers, interconnected in a closed circuit traversed by a fluidic heat carrier, serves to preheat a flow of ambient air downstream of a compressor which impels that flow toward a combustion chamber where an air-fuel mixture is ignited to drive a turbine coupled with the compressor. The other heat exchanger, which extends radially beyond the first-mentioned heat exchanger to create a thermosiphon effect for the circulation of the carrier, abstracts residual heat from the expanding gas flow downstream of the turbine. In one embodiment, the compressor and the turbine are interconnected by a central shaft surrounded by a coaxial tubular member which carries the two heat exchangers; in another embodiment this relationship is reversed.

4 Claims, 3 Drawing Figures

ROTARY HEAT EXCHANGERS IN THE FORM OF TURBINES

This is a division of application Ser. No. 84,097, filed Oct. 26, 1970, now U.S. Pat. No. 3,811,495, granted May 21, 1974.

FIELD OF THE INVENTION

My present invention relates to a heat engine of the type wherein a fluidic heat carrier travels in a closed circuit and interacts with an external working fluid rich in ambient air, upstream of a compressor, to preheat the external fluid on its way to a combustion chamber where a combustible mixture of that fluid with injected fuel is ignited to generate an expanding gas flow; the latter, in turn, drives the compressor through a turbine coupled therewith and thereafter reheats the circulating heat carrier.

BACKGROUND OF THE INVENTION

In such an engine it is known to utilize the so-called thermosiphon effect by allowing the carrier to be cooled in an inner section and to be reheated in an outer section of a rotating heat exchanger whereby the centrifugal force, accelerating the outwardly flowing colder medium and retarding the inwardly flowing hotter medium, has a resultant promoting this circulation.

OBJECT OF THE INVENTION

The object of my invention is to provide a mechanically and thermally improved heat engine of this character.

SUMMARY OF THE INVENTION

I realize this object, in accordance with the present invention, by replacing the aforedescribed rotary heat exchanger by two axially separated annular heat exchangers, i.e. a first heat exchanger downstream of the turbine and a second heat exchanger between the compressor and the combustion chamber. The two heat exchangers intercommunicate through a conduit system which extends through one of two coaxial members rotatable independently of each other, the other of these members carrying the compressor and the turbine. In order to satisfy the requirements of the thermosiphon principle, the first heat exchanger must extend radially beyond the second heat exchanger; because of the axial separation, however, the two heat exchangers may radially overlap so that the overall structure can be made of smaller diameter than if one of them concentrically surrounded the other as in conventional engines of this type. Advantageously, according to another feature of my invention, a radial partition is interposed between these heat exchangers to provide thermal and fluidic separation therebetween.

BRIEF DESCRIPTION OF THE DRAWING

The invention will now be further explained with reference to the accompanying drawing as regards its principle of operation and the improvements which it provides. In the drawing.

SPECIFIC DESCRIPTION

Figure 1:
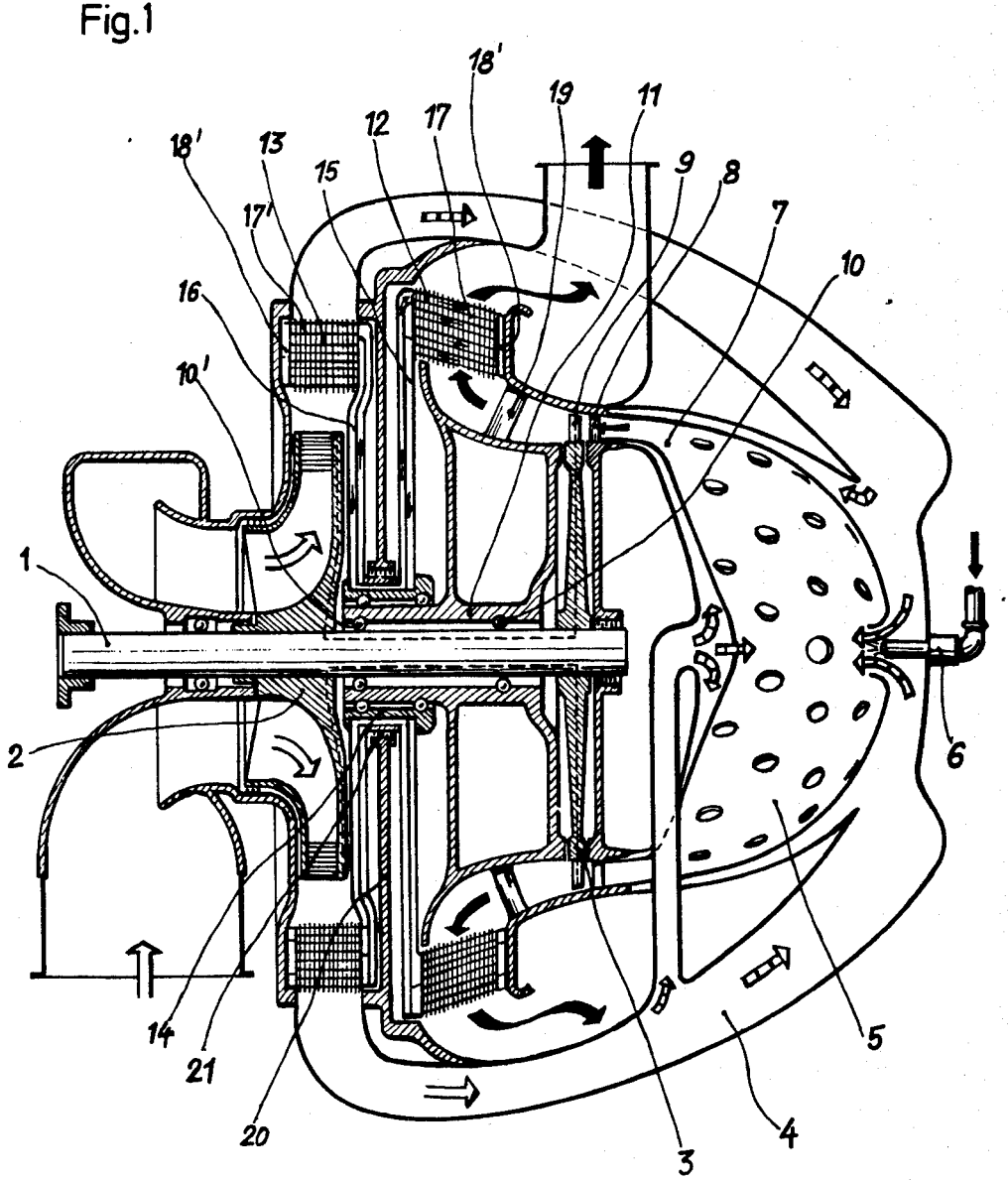
FIG. 1 shows a gas turbine with a heat exchanger filled with a liquid and arranged between a compressor and a turbine rotor.

FIG. 1 shows a gas turbine according to the invention. The shaft 1 carries the radial-compressor wheel 2 and the axial-turbine wheel 3. The coaxial and approximately rotationally symmetrical combustion chamber 5 is supplied with compressed air via the conduits 4 and with fuel via the nozzle 6. The hot gases are expanded in the annular chamber 7. Thereafter the combustion gases flow through a guide-blade ring 8 and then traverse the axial blades 9 of the turbine wheel 3. The shaft 1 is carried in anti-friction bearings 10 and 10' in the housing portion 11, and a heat-exchanger unit, consisting of a first heat exchanger 12 constituting the heat sink and a second heat exchanger 13 through which the compressor air flows, is also carried by the same stationary housing portion 11 by means of a hub 14. Channels 15 and 16 lead to the hub 14. The heat exchangers 12 and 13 consist of tubes 17 and 17' having substantially parallel axes, the tubes communicating with one another at their outlying ends by rotary annular chambers 18 and 18' and with the channels 15 and 16 at their opposite ends. The entire channel system is filled with a thermally stable liquid, preferably an eutectic of sodium and potassium. A guide-blade ring 19 gives the stream of exhaust gas emerging from the axial blading 8, 9 a whirl whose thrust serves the purpose of driving the heat-exchanger unit 12 and 13 by its passage through the heat exchanger 12. As a result of the rotation of the heat exchangers and the heating up of the wall of the channels facing the turbine, the internal liquid heat carrier is set in circulation in the direction of the arrows, since in the larger-diameter heat exchanger 12 the inwardly flowing liquid stream is of lower density than the portion of liquid flowing outwardly from the interior. In this way the heat which is withdrawn from the exhaust gas in the heat exchanger 12 is transferred to the compressor air via the heat exchanger 13. A partition 20 which is made up of two halves and carries a shaft seal 21 separates the heat exchangers. The power take-off is via the shaft 1.

Figure 2:
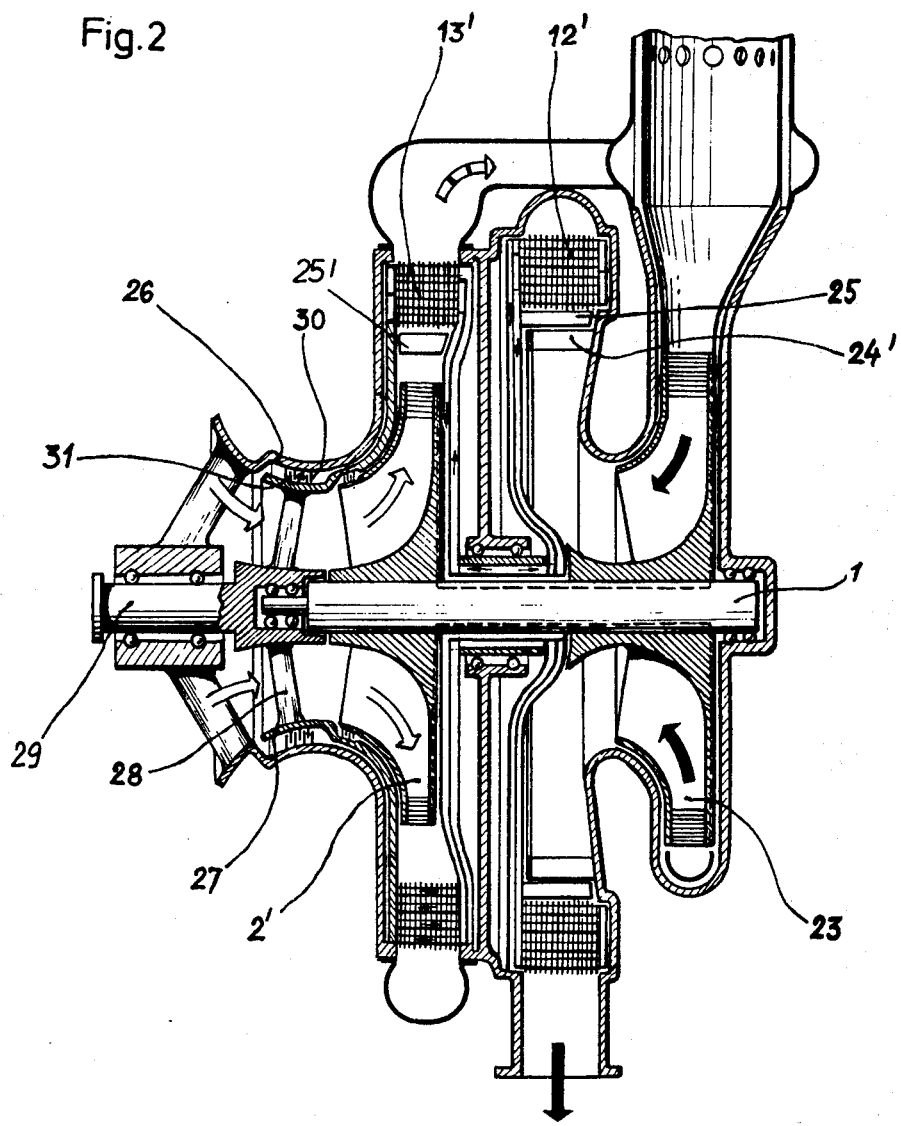
FIG. 2 shows a comparable gas turbine in which the heat exchanger is used to provide the entire torque.

FIG. 2 shows a similar arrangement in which the heat exchangers 12' and 13' assume not only the function of recuperation but also that of a fluid transmission. The high-speed machine consisting of a radial-compressor wheel 2' and a radial turbine 23 serves exclusively the purpose of generating hydraulic energy. This hydraulic energy drives the rotary heat exchangers 12' and 13', a guide-blade ring 24 and a rotor-blade ring 25 being so dimensioned that they are capable of transforming this hydraulic energy into mechanical energy on the shaft. Between the housing wall 26 and the radial-compressor wheel 2' a ring 27 extends which seals in both directions by means of a labyrinth seal 30, 31 and which forms a unit with the driving shaft 29 via spokes 28. The arrangement shown makes considerable reduction ratios possible.

Figure 3:
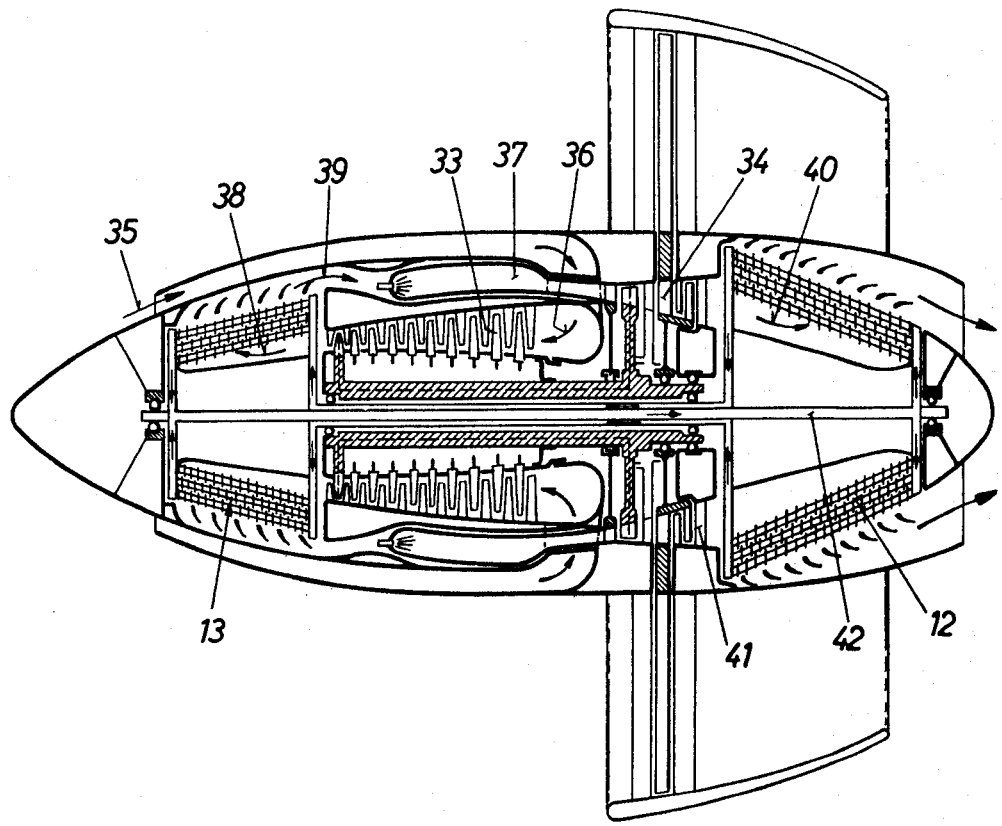
FIG. 3 shows a gas turbine in which the heat exchanger is arranged fore and aft of a compressor-turbine unit.

FIG. 3 shows diagrammatically an arrangement of a fan drive, in which the heat exchangers 12 and 13 are arranged outside the gas turbine consisting of a compressor 33 which leads to the heat exchanger 13 and a turbine stage 34 leading to the heat exchanger 12. The air enters in the direction of the arrow 35, is conducted to the compressor 33 in the direction of the arrow 36 via deflectors which are distributed over the circumference and which cross the annular combustion chamber 37, thence flows in the direction of the arrow 38 through the heat exchanger 13, thence in the direction of the arrow 39 into the combustion chamber, thereafter through the turbine stage 34, finally to be conducted in the direction of the arrow 40 through the heat exchanger 12; the latter is caused to rotate by the whirl component produced in the guide wheel 41. The internal channels of heat exchanger 12 communicate with those of the heat exchanger 13 via an axially extending twin tube 42.

I claim:

1. A heat engine comprising:

a housing provided with a combustion chamber;

a central shaft member rotatably journaled in said housing;

a tubular member coaxial with said shaft member journaled in said housing for rotation independently of said shaft member;

a first and a second annular heat exchanger mounted at axially spaced-apart locations on one of said members for joint rotation therewith, said first heat exchanger extending radially beyond said second heat exchanger;

first conduit means forming a closed circuit through said heat exchangers for a fluidic heat carrier, said circuit passing through said one of said members;

second conduit means for conducting a working fluid rich in ambient air in an open circuit through said housing via said second heat exchanger, said combustion chamber and said first heat exchanger;

fuel-inlet means in said combustion chamber for producing therein a combustible fuel/air mixture generating an expanding gas flow upon ignition thereof;

a turbine mounted on the other of said members between said combustion chamber and said first heat exchanger for rotary displacement by said expanding gas flow;

a compressor in said open circuit upstream of said second heat exchanger mounted on said other of said members for rotary entrainment by said turbine to drive said working fluid into said combustion chamber; and radial partition means rigid with said housing interposed between said first and second heat exchangers said partition means enabling close axial spacing of said heat exchangers.

2. A heat engine as defined in claim 1 wherein said one of said members is said tubular member, further comprising seal means inserted between said tubular member and said partition.

3. A heat engine as defined in claim 1 wherein said combustion chamber is disposed coaxially with said central shaft member adjacent one end thereof.

4. A heat engine as defined in claim 1 wherein said one of said members is said tubular member, further comprising a drive shaft rigid with said heat exchangers in line with said central shaft member.

* * * * *